United States Patent
Davis et al.

(10) Patent No.: US 11,664,519 B2
(45) Date of Patent: May 30, 2023

(54) FUEL CELL MODULE ASSEMBLY AND SYSTEMS USING SAME

(71) Applicants: EXXONMOBIL RESEARCH AND ENGINEERING COMPANY, Annandale, NJ (US); FUELCELL ENERGY, INC., Danbury, CT (US)

(72) Inventors: Keith E. Davis, Southbury, CT (US); Frank Hershkowitz, Basking Ridge, NJ (US); Lu Han, Beaumont, TX (US); Clay R. Sutton, Pittstown, NJ (US); Paul J. Rubas, Milford, NJ (US)

(73) Assignees: EXXONMOBIL RESEARCH AND ENGINEERING COMPANY, Annandale, NY (US); FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 16/695,368

(22) Filed: Nov. 26, 2019

(65) Prior Publication Data

US 2021/0159534 A1    May 27, 2021

(51) Int. Cl.
*H01M 8/24* (2016.01)
*H01M 8/2475* (2016.01)
(Continued)

(52) U.S. Cl.
CPC ..... *H01M 8/2475* (2013.01); *H01M 8/04014* (2013.01); *H01M 8/04089* (2013.01);
(Continued)

(58) Field of Classification Search
CPC ............. H01M 8/2475; H01M 8/2483; H01M 8/2484; H01M 8/04014; H01M 8/04089;
(Continued)

(56) References Cited

U.S. PATENT DOCUMENTS

| 3,615,839 A | 10/1971 | Thompson et al. |
| 3,970,474 A | 7/1976 | Anbar et al. |

(Continued)

FOREIGN PATENT DOCUMENTS

| CA | 2120858 A1 | 10/1994 |
| CA | 2325072 A1 | 4/2002 |

(Continued)

OTHER PUBLICATIONS

"Heat of Combustion", Wikipedia, Retrieved from Internet URL : http://en.wikipediaorg/wiki/Lower_heating_value, accessed on Jun. 24, 2014, pp. 8.

(Continued)

*Primary Examiner* — Raymond Alejandro
(74) *Attorney, Agent, or Firm* — Shook Hardy & Bacon LLP (57) ABSTRACT

A module assembly is provided including a fuel cell stack assembly, a heat exchanger, and a housing enclosing the fuel cell stack assembly and the heat exchanger. The heat exchanger is configured to receive process gas from an external source and output said process gas to the fuel cell stack assembly, and configured to receive process gas from the fuel cell stack assembly and output said process gas. A fuel cell power plant is provided including a module assembly with a first end, a racking structure configured to hold the module assembly, balance of plant equipment, and ducting configured to provide fluid communication between the balance of plant equipment and the first end of the module assembly. The module assembly and the racking structure are configured such that the module assembly may be removed from the racking structure in a direction away from the first end of the module assembly.

6 Claims, 5 Drawing Sheets

(51) Int. Cl.
  *H01M 8/2483* (2016.01)
  *H01M 8/2484* (2016.01)
  *H01M 8/04014* (2016.01)
  *H01M 8/04089* (2016.01)
  *H01M 8/04701* (2016.01)
  *H01M 8/249* (2016.01)

(52) U.S. Cl.
  CPC ....... *H01M 8/04708* (2013.01); *H01M 8/249* (2013.01); *H01M 8/2483* (2016.02); *H01M 8/2484* (2016.02); *H01M 2250/10* (2013.01)

(58) Field of Classification Search
  CPC ............. H01M 8/04708; H01M 8/249; H01M 2250/10
  See application file for complete search history.

(56) References Cited

U.S. PATENT DOCUMENTS

| | | |
|---|---|---|
| 4,041,210 A | 8/1977 | Van Dine |
| 4,160,663 A | 7/1979 | Hsieh |
| 4,772,634 A | 9/1988 | Farooque |
| 4,800,052 A | 1/1989 | Swarr et al. |
| 4,810,595 A | 3/1989 | Kahara et al. |
| 4,917,971 A | 4/1990 | Farooque |
| 4,921,765 A | 5/1990 | Gmeindl et al. |
| 4,983,472 A | 1/1991 | Katz et al. |
| 4,995,807 A | 2/1991 | Rampley et al. |
| 5,039,579 A | 8/1991 | Kinoshita |
| 5,071,719 A | 12/1991 | Rostrup-Nielsen et al. |
| 5,079,103 A | 1/1992 | Schramm |
| 5,082,752 A | 1/1992 | Koga et al. |
| 5,084,362 A | 1/1992 | Farooque |
| 5,134,043 A | 7/1992 | Nakazawa |
| 5,169,717 A | 12/1992 | Topsoe |
| 5,198,311 A | 3/1993 | Nakazawa et al. |
| 5,208,113 A | 5/1993 | Kinoshita |
| 5,232,793 A | 8/1993 | Miyauchi et al. |
| 5,376,472 A | 12/1994 | Hartvigsen et al. |
| 5,380,600 A | 1/1995 | Hansen et al. |
| 5,413,878 A | 5/1995 | Williams et al. |
| 5,417,051 A | 5/1995 | Ankersmit et al. |
| 5,422,195 A | 6/1995 | Bernard |
| 5,468,573 A | 11/1995 | Bregoli et al. |
| 5,470,670 A | 11/1995 | Yasumoto et al. |
| 5,518,827 A | 5/1996 | Matsumura et al. |
| 5,541,014 A | 7/1996 | Micheli et al. |
| 5,554,453 A | 9/1996 | Steinfeld et al. |
| 5,616,430 A | 4/1997 | Aoyama |
| 5,688,292 A | 11/1997 | Antolini |
| 5,736,026 A | 4/1998 | Patel et al. |
| 5,833,734 A | 11/1998 | Cip et al. |
| 6,030,718 A | 2/2000 | Fuglevand et al. |
| 6,063,141 A | 5/2000 | Wendt et al. |
| 6,083,636 A | 7/2000 | Hsu |
| 6,090,312 A | 7/2000 | Ziaka et al. |
| 6,126,718 A | 10/2000 | Sawa et al. |
| 6,162,556 A | 12/2000 | Vollmar et al. |
| 6,267,799 B1 | 7/2001 | Innes et al. |
| 6,322,916 B1 | 11/2001 | Hemmes et al. |
| 6,365,290 B1 | 4/2002 | Ghezel-Ayagh et al. |
| 6,383,251 B1 | 5/2002 | Sherwood |
| 6,383,677 B1 | 5/2002 | Allen |
| 6,420,062 B1 | 7/2002 | Prohaska et al. |
| 6,492,045 B1 | 12/2002 | Blanchet et al. |
| 6,509,113 B2 | 1/2003 | Keegan |
| 6,524,356 B2 | 2/2003 | Fournier et al. |
| 6,648,942 B2 | 11/2003 | Hoffman et al. |
| 6,896,988 B2 | 5/2005 | Wang et al. |
| 7,311,986 B2 | 12/2007 | Hsu |
| 7,396,603 B2 | 7/2008 | Farooque et al. |
| 7,503,178 B2 | 3/2009 | Bucker et al. |
| 7,563,527 B2 | 7/2009 | Tanaka et al. |
| 7,862,938 B2 | 1/2011 | Ghezel-Ayagh |
| 7,914,765 B2 | 3/2011 | McLean et al. |
| 7,939,219 B2 | 5/2011 | Johnsen et al. |
| 8,047,007 B2 | 11/2011 | Zubrin et al. |
| 8,080,344 B2 | 12/2011 | Skok et al. |
| 8,142,943 B2 | 3/2012 | McElroy et al. |
| 8,349,504 B1 | 1/2013 | Radovich |
| 8,557,468 B2 | 10/2013 | Hilmi et al. |
| 8,562,903 B2 | 10/2013 | Hayton et al. |
| 8,802,332 B2 | 8/2014 | Correa et al. |
| 8,822,090 B2 | 9/2014 | Ma et al. |
| 9,077,007 B2 | 7/2015 | Berlowitz et al. |
| 2002/0106549 A1 | 8/2002 | Cooper et al. |
| 2002/0142208 A1 | 10/2002 | Keefer et al. |
| 2002/0164522 A1 | 11/2002 | Huang et al. |
| 2003/0008183 A1 | 1/2003 | Hsu |
| 2003/0096155 A1 | 5/2003 | Hong et al. |
| 2003/0143448 A1 | 7/2003 | Keefer |
| 2003/0219637 A1 | 11/2003 | Coors |
| 2004/0038089 A1 | 2/2004 | Hoffjann et al. |
| 2004/0038115 A1 | 2/2004 | Johnsen et al. |
| 2004/0043274 A1 | 3/2004 | Scartozzi et al. |
| 2004/0202914 A1 | 10/2004 | Sridhar et al. |
| 2005/0079395 A1 | 4/2005 | Varatharajan et al. |
| 2005/0106429 A1 | 5/2005 | Keefer |
| 2005/0112425 A1 | 5/2005 | Hsu |
| 2005/0123810 A1 | 6/2005 | Balan |
| 2005/0164051 A1 | 7/2005 | Venkataraman et al. |
| 2005/0181247 A1 | 8/2005 | Foger et al. |
| 2006/0127718 A1 | 6/2006 | Kurashima et al. |
| 2006/0159967 A1 | 7/2006 | Huijsmans et al. |
| 2006/0204806 A1 | 9/2006 | Takada et al. |
| 2006/0251940 A1 | 11/2006 | Bandhauer et al. |
| 2006/0269830 A1 | 11/2006 | Johnsen et al. |
| 2007/0017367 A1 | 1/2007 | McElroy et al. |
| 2007/0072027 A1 | 3/2007 | Sridhar et al. |
| 2007/0099038 A1 | 5/2007 | Galloway |
| 2007/0184310 A1 | 8/2007 | Kim et al. |
| 2007/0224467 A1 | 9/2007 | Nervi et al. |
| 2007/0287046 A1 | 12/2007 | Koda et al. |
| 2008/0057361 A1 | 3/2008 | Moon et al. |
| 2008/0124255 A1 | 5/2008 | Johnston |
| 2008/0160358 A1 | 7/2008 | Parodi et al. |
| 2009/0029204 A1 | 1/2009 | Venkataraman |
| 2009/0042070 A1 | 2/2009 | Brown, Jr. et al. |
| 2009/0169452 A1 | 7/2009 | Constantz et al. |
| 2009/0208784 A1 | 8/2009 | Perry et al. |
| 2009/0317667 A2 | 12/2009 | Nervi et al. |
| 2009/0317669 A1 | 12/2009 | Hildebrandt et al. |
| 2010/0015486 A1 | 1/2010 | Yoshiba |
| 2010/0148410 A1 | 6/2010 | Bleifuss et al. |
| 2010/0239924 A1 | 9/2010 | McElroy et al. |
| 2011/0033771 A1 | 2/2011 | Bednarz et al. |
| 2011/0104577 A1 | 5/2011 | Cui et al. |
| 2011/0111315 A1 | 5/2011 | Cui et al. |
| 2011/0117460 A1 | 5/2011 | Shin |
| 2011/0154951 A1 | 6/2011 | Hiraoka |
| 2011/0167821 A1 | 7/2011 | Baker et al. |
| 2011/0171544 A1 | 7/2011 | Burmeister et al. |
| 2011/0223500 A1 | 9/2011 | Uematsu et al. |
| 2011/0223501 A1 | 9/2011 | Uematsu et al. |
| 2012/0028145 A1 | 2/2012 | Boden et al. |
| 2012/0171588 A1 | 7/2012 | Fan et al. |
| 2012/0214076 A1 | 8/2012 | Hakala |
| 2012/0251898 A1 | 10/2012 | Lehar et al. |
| 2012/0295180 A1 | 11/2012 | Homma |
| 2012/0325053 A1 | 12/2012 | Grossi |
| 2013/0014484 A1 | 1/2013 | Caprile et al. |
| 2013/0081516 A1 | 4/2013 | Simmons |
| 2013/0177824 A1 | 7/2013 | Cui et al. |
| 2013/0209904 A1 | 8/2013 | Liu et al. |
| 2013/0337360 A1 | 12/2013 | Mahoney et al. |
| 2014/0242482 A1 | 8/2014 | Cui et al. |
| 2014/0260310 A1 | 9/2014 | Berlowitz et al. |
| 2015/0093665 A1 | 4/2015 | Barckholtz et al. |
| 2015/0280265 A1 | 10/2015 | McLarty |
| 2016/0190604 A1 | 6/2016 | Evans et al. |
| 2016/0190613 A1 | 6/2016 | Shiokawa et al. |
| 2017/0040620 A1 | 2/2017 | Uwani |
| 2017/0191139 A1 | 7/2017 | Berlowitz et al. |

(56) References Cited

U.S. PATENT DOCUMENTS

| | | |
|---|---|---|
| 2017/0271701 A1 | 9/2017 | Berlowitz et al. |
| 2019/0051919 A1 | 2/2019 | Yoshizaki et al. |
| 2019/0131636 A1 | 5/2019 | Horst et al. |
| 2019/0198904 A1 | 6/2019 | Ichikawa et al. |
| 2019/0386317 A1 | 12/2019 | Poizeau et al. |
| 2020/0020965 A1* | 1/2020 | Wang ............... H01M 8/04686 |
| 2020/0099066 A1 | 3/2020 | Ghezel-Ayagh |
| 2020/0176783 A1 | 6/2020 | Rosen et al. |
| 2020/0176787 A1 | 6/2020 | Geary et al. |
| 2020/0176795 A1 | 6/2020 | Johnson |

FOREIGN PATENT DOCUMENTS

| | | |
|---|---|---|
| CA | 2551219 A1 | 1/2007 |
| CA | 2694153 A1 | 9/2011 |
| CN | 101098022 A | 1/2008 |
| CN | 201902241 U | 7/2011 |
| CN | 207542331 U | 6/2018 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 670 090 A1 | 6/2006 |
| EP | 1 926 171 A1 | 5/2008 |
| EP | 2 182 572 A1 | 5/2010 |
| EP | 2 991 139 A1 | 3/2016 |
| JP | S56-69775 A | 6/1981 |
| JP | H02-075164 A | 3/1990 |
| JP | H03-001447 A | 1/1991 |
| JP | H04-039868 A | 2/1992 |
| JP | H05-029009 A | 2/1993 |
| JP | H05-163180 A | 6/1993 |
| JP | H05-503606 A | 6/1993 |
| JP | H08-96824 A | 4/1996 |
| JP | H08-138701 A | 5/1996 |
| JP | H10-172595 A | 6/1998 |
| JP | H11-91427 A | 4/1999 |
| JP | H11-312527 A | 11/1999 |
| JP | 2002-151111 A | 5/2002 |
| JP | 2002-319428 A | 10/2002 |
| JP | 2004-014124 A | 1/2004 |
| JP | 2004-079495 A | 3/2004 |
| JP | 2004-186074 A | 7/2004 |
| JP | 2004-523086 A | 7/2004 |
| JP | 2005-190981 A | 7/2005 |
| JP | 2006-073316 A | 3/2006 |
| JP | 2007-287580 A | 11/2007 |
| JP | 2008-527617 A | 7/2008 |
| JP | 2008-192425 A | 8/2008 |
| JP | 2008-287940 A | 11/2008 |
| JP | 2009-043487 A | 2/2009 |
| JP | 2013-045535 A1 | 3/2013 |
| JP | 2016-517616 A | 6/2016 |
| JP | 2016-532243 A | 10/2016 |
| JP | 2019-508860 A | 3/2019 |
| KR | 10-0651270 B1 | 11/2006 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2006/072262 A1 | 7/2006 |
| WO | 2008/036169 A2 | 3/2008 |
| WO | 2010/044113 A1 | 4/2010 |
| WO | 2010/067223 A1 | 6/2010 |
| WO | 2010/125443 A1 | 11/2010 |
| WO | 2010/147885 A1 | 12/2010 |
| WO | 2010/147886 A1 | 12/2010 |
| WO | 2011/077224 A1 | 6/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2017/223218 A1 | 12/2017 |

OTHER PUBLICATIONS

"Lower and Higher Heating Values of Fuels", Hydrogen Data Resource Center: Hydrogen Calculator, p. 1 (2012).
"Molten Carbonate Fuel Cell Technology", Fossil Energy—U.S. Department of Energy, pp. 2 (Jan. 31, 2011).
"Test and Quality Assurance Plan : FuelCell Energy, Inc.—DFC 300A Molten Carbonate Fuel Cell Combined Heat and Power System", Greenhouse Gas Technology Center, pp. 1-42 (Mar. 2007).
Avidan, A. A., "Gasoline and Distillate Fuels from Methanol", Elsevier Science Publishers B.V, pp. 307-323 (1988).
Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).
Appleby, A. J., "Fuel Cells and Hydrogen Fuel", International Journal of Hydrogen Energy, vol. 19, No. 2, pp. 175-180 (1994).
Amorelli, A., et al., "An experimental investigation into the use of molten carbonate fuel cells to capture CO2 from gas turbine exhaust gases", Second annual conference on Carbon Sequestration, pp. 1-9 (May 5-8, 2003).
Amorelli, A., et al., "An experimental investigation into the use of molten carbonate fuel cells to capture CO2 from gas turbine exhaust gases", Energy, vol. 29, pp. 1279-1284 (2004).
Abu-Zahra, M. R.M, et al.,"CO2 capture from power plants: Part I. A parametric study of the technical performance based on monoethanolamine", International Journal of Greenhouse Gas Control, vol. 1, pp. 37-46 (2007).
Appl, M., "Ammonia, 3. Production Plants", Ullmann's Encyclopedia of Industrial Chemistry, vol. 3, pp. 1-35 (2012).
Bianchi A., et al., "Bimodal Pore Size Distribution in MCFC Cathode Structure", Extended Abstracts, Electrochemical Society, vol. 95/01, pp. 858-859 (May 1995).
Cavallaro, S., et al., "Syngas and electricity production by an integrated autothermal reforming/molten carbonate fuel cell system", Journal of Power Sources, vol. 76, pp. 190-196 (1998).
Chiesa, P., et al., "A Comparative Analysis of IGCCs with CO2 Sequestration", Greenhouse Gas Control Technologies, pp. 107-112 (1999).
Campanari, S., "Carbon Dioxide separation from high temperature fuel cell power plants", Journal of Power Sources, vol. 112, pp. 273-289 (2002).
Campanari, S., et al., "CO2 capture from combined cycles integrated with Molten Carbonate Fuel Cells", International Journal of Greenhouse Gas Control, vol. 4, pp. 441-451 (2010).

(56) References Cited

OTHER PUBLICATIONS

Campanari, S., et al., "Application of MCFCs for active CO2 capture within natural gas combined cycles", Energy Procedia, vol. 4, pp. 1235-1242 (2011).
Caprile, L., et al., "Carbon capture: Energy wasting technologies or the MCFCs challenge?", International Journal of Hydrogen Energy, vol. 36, pp. 10269-10277 (2011).
Chiesa, P., et al., "CO2 cryogenic separation from combined cycles integrated with molten carbonate fuel cells", International Journal of Hydrogen Energy, vol. 36, pp. 10355-10365 (2011).
Desideri, U., et al., "MCFC-based CO2 capture system for small scale CHP plants", International Journal of Hydrogen Energy, vol. 37, pp. 19295-19303 (2012).
Ghezel-Ayagh, H., "High Efficiency Direct FuelCell/Turbine® Power Plant", Project Fact Sheet, Fuel Cell Energy, pp. 3 (2011).
Ghezel-Ayagh, H., "Electrochemical Membrane for CO2 Capture and Power Generation", Presentation at the 2012 NETL CO2 Capture Technology Meeting, Fuel Cell Energy, pp. 12 (Jul. 9, 2012).
Giddey, S., et al., "A comprehensive review of direct carbon fuel cell technology", Progress in Energy Combustion Science, vol. 38, pp. 360-399 (2012).
Keil, F. J., "Methanol-to-hydrocarbons: process technology", Microporous and Mesoporous Materials, vol. 29, pp. 49-66 (1999).
Kim, D. H., et al., "Numerical studies of a separator for stack temperature control in a molten carbonate fuel cell", International Journal of Hydrogen Energy, vol. 36, pp. 8499-8507 (2011).
Lowe, C., et al., "Technology Assessment of Hydrogen Firing of Process Heaters", Energy Procedia, ScienceDirect, vol. 4, pp. 1058-1065 (2011).
Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).
Manzolini, G., et al., "CO2 Separation from Combined Cycles Using Molten Carbonate Fuel Cells", Journal of Fuel Dell Science and Technology, vol. 9, pp. 011018-1 to 011018-8 (2012).
Naqvi, S. N., "Dimethyl Ether As Fuel", SRI Consulting Report, Report No. 245A, pp. 188 (Sep. 2005).
Pilatowsky, I., et al., "Thermodynamics Of Fuel Cells", Cogeneration Fuel Cell-Sorption Air Conditioning Systems, pp. 25-36 (2011).
Sugiura, K., et al., "The carbon dioxide concentrator by using MCFC", Journal of Power Sources, vol. 118, pp. 218-227 (2003).
Steynberg, A., "Gas loop for POX reformers : Figure 8", Studies in Surface Science and Catalysis: Fischer Tropsch Technology, vol. 152, pp. 8 (2004).
Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).
Wesoff, E., "Will FuelCell Energy Be The First Profitable Company In The Industry?", Greentech Media, pp. 3 (Dec. 15, 2011).
Zhou, W., et al., "Decrease of energy demand for bioethanol-based polygeneration system through case study", Applied Energy, vol. 95, pp. 305-311 (2012).
International Search Report and Written Opinion received for PCT Patent Application No. PCT/US2019/063296, dated Feb. 18, 2020, 11 pages.
International Search Report and Written Opinion received for PCT Patent Application No. PCT/US2019/063255, dated Mar. 4, 2020, 11 pages.
International Search Report and Written opinion received for PCT Patent Application No. PCT/US2019/063293, dated Mar. 13, 2020, 10 pages.
International Search Report and Written Opinion received for PCT Patent Application No. PCT/US2019/063301, dated Mar. 13, 2020, 9 pages.
International Search Report and Written Opinion received for PCT Patent Application No. PCT/US2019/063248, dated Mar. 13, 2020, 10 pages.
International Search Report and Written Opinion received for PCT Patent Application No. PCT/US2019/063434, dated Mar. 24, 2020, 11 pages.
International Search Report and Written Opinion received for PCT Patent Application No. PCT/US2019/063337, dated Mar. 31, 2020, 9 pages.
International Search Report and Written Opinion received for PCT Patent Application No. PCT/US2019/063304, dated Apr. 1, 2020, 11 pages.
International Search Report and Written Opinion received for PCT Patent Application No. PCT/US2019/063291, dated Aug. 18, 2020, 13 pages.
International Search Report and Written Opinion received for PCT Patent Application No. PCT/US2019/063345, dated Aug. 20, 2020, 13 pages.
International Search Report and Written Opinion received for PCT Patent Application No. PCT/US2019/063333, dated Nov. 25, 2020, 20 pages.
Campanari, S., et al., "Using MCFC for high efficiency CO2 capture from natural gas combined cycles: Comparison of internal and external reforming", Applied Energy, 112, pp. 772-783 (2013).
Non-Final Office Action dated Jun. 16, 2021 in U.S. Appl. No. 16/695,356, 5 pages.
Non-Final Office Action dated Aug. 3, 2021 in U.S. Appl. No. 16/695,276, 17 pages.
Non-Final Office Action dated Aug. 10, 2021 in U.S. Appl. No. 16/695,281, 15 pages.
Notice of Allowance dated Aug. 17, 2021 in U.S. Appl. No. 16/695,335, 12 pages.
Notice of Allowance dated Nov. 23, 2021 in U.S. Appl. No. 16/695,356, 15 pages.
Final Office Action dated Dec. 21, 2021 in U.S. Appl. No. 16/695,281, 12 pages.
Non-Final Office Action dated Jan. 7, 2022 in U.S. Appl. No. 16/695,286, 6 pages.
Final Office Action dated Jan. 11, 2022 in U.S. Appl. No. 16/695,276, 17 pages.
Non-Final Office Action dated Jan. 20, 2022 in U.S. Appl. No. 16/695,280, 17 pages.
Non-Final Office Action dated Feb. 4, 2022 in U.S. Appl. No. 16/695,278, 18 pages.
Notice of Reasons for Refusal and Search Report received in JP Patent Application No. 2021-531318, dated May 31, 2022, 43 pages [Machine Translation Submitted].
Notice of Reasons for Refusal and Search Report received in JP Patent Application No. 2021-531317, dated May 31, 2022, 38 pages. [Machine Translation Submitted].
International Preliminary Report on Patentability received for PCT Application No. PCT/US2019/063291, dated Jun. 9, 2022, 8 pages.
International Preliminary Report on Patentability received for PCT Application No. PCT/US2019/063333, dated Jun. 9, 2022, 12 pages.
International Preliminary Report on Patentability received for PCT Application No. PCT/US2019/063345, dated Jun. 9, 2022, 7 pages.
Notice of Allowance dated Jun. 10, 2022 in U.S. Appl. No. 16/695,286, 11 pages.
Final Office Action dated Jul. 25, 2022 in U.S. Appl. No. 16/695,278, 19 pages.
Final Office Action dated Jul. 27, 2022 in U.S. Appl. No. 16/695,280, 17 pages.
Non-Final Office Action dated Jul. 29, 2022 in U.S. Appl. No. 16/695,281, 14 pages.
Notice of Allowance dated Sep. 8, 2022 in U.S. Appl. No. 16/695,276, 7 pages.
Notice of Reasons for Refusal received in JP Patent Application No. 2021-531318, dated Oct. 4, 2022, 8 pages. (English Translation Submitted).
Final Office Action dated Sep. 21, 2022 in U.S. Appl. No. 16/695,362, 12 pages.
Non-Final Office Action dated Mar. 16, 2022 in U.S. Appl. No. 16/695,362, 11 pages.
Notice of Allowance dated Apr. 19, 2022 in U.S. Appl. No. 16/695,349, 9 pages.

(56) References Cited

OTHER PUBLICATIONS

Non Final Office Action dated May 10, 2022 in U.S. Appl. No. 16/696,821, 8 pages.
Office Action received for Canadian Patent Application No. 3121537, dated Mar. 21, 2022, 4 pages.
Office Action received for Canadian Patent Application No. 3121538, dated Mar. 21, 2022, 4 pages.
Decision to Grant received in JP Patent Application No. 2021-531317, dated Nov. 29, 2022, 5 pages. (English Translation Submitted).
Canadian Office Action received for Canadian Patent Application No. 3121537, dated Jan. 9, 2023, 3 pages.
"20 Mesh T316 Stainless .009 Wire Dia", Twp Inc., accessed at https://www.twpinc.com/20-mesh-t316-stainless-009-wire-dia, accessed on Jan. 4, 2023, 2 pages.
Notice of Allowance dated Oct. 27, 2022 in U.S. Appl. No. 16/696,821, 12 pages.
Notice of Allowance dated Nov. 16, 2022 in U.S. Appl. No. 17/867,324, 8 pages.
Final Office Action dated Jan. 3, 2023 in U.S. Appl. No. 16/695,276, 11 pages.
Non-Final Office Action dated Jan. 17, 2023 in U.S. Appl. No. 17/941,291, 11 pages.
Notice of Allowance dated Feb. 1, 2023 in U.S. Appl. No. 16/695,278, 8 pages.
Non-Final Office Action dated Apr. 14, 2023 in U.S. Appl. No. 16/695,281, 13 pages.
First Examination Report received for Australian Patent Application No. 2019476316, dated Jan. 25, 2023, 2 pages.
Office Action received for Canadian Patent Application No. 3159772, dated Feb. 23, 2023, 3 pages.
Notice of Allowance received for Canadian Patent Application No. 3121538, dated Mar. 7, 2023, 1 page.
Canadian Office Action received for Canadian Patent Application No. 3162231, dated Mar. 16, 2023, 3 pages.
First Examination Report received for Australian Patent Application No. 2019476660, dated Mar. 17, 2023, 3 pages.
First Examination Report received for Australian Patent Application No. 2019476338, dated Apr. 14, 2023, 4 pages.
Non-Final Office Action dated Apr. 18, 2023 in U.S. Appl. No. 17/677,363, 8 pages.

* cited by examiner

FUEL CELL MODULE ASSEMBLY AND SYSTEMS USING SAME

ExxonMobil Research and Engineering Company and FuelCell Energy, Inc. are parties to a joint research agreement.

BACKGROUND

The present application relates generally to the field of fuel cell module assemblies and systems using those module assemblies, and more particularly to fuel cell module assemblies with integrated thermal components than can be grouped into clusters and systems using those clusters.

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air or flue gas output from a combustion source.

Fuel cells are typically arranged in a stacked relationship. One fuel cell stack configuration includes an externally manifolded stack, wherein the fuel cell stack is left open on its sides and a fluid such as a fuel or oxidant is delivered by way of manifolds sealed to peripheral portions of respective sides of the fuel cell stack. The manifolds thus provide sealed passages for delivering the fuel and the oxidant gases to the fuel cells and directing the flow of such gases in the stack, thereby preventing those gases from leaking either to the environment or to the other manifolds. Such manifolds are typically used in molten carbonate fuel cells (MCFC) which operate at approximately 650° C.

In order to increase power output without having to unduly increase the size (i.e., surface area) of individual fuel cells or the number of individual fuel cells in a fuel cell stack, a plurality of fuel cell stacks are electrically and fluidly connected. For large module enclosure concepts including a large number of fuel cell stacks (which may be constructed and conditioned offsite from the ultimate power plant site), it is difficult or impossible to transport the module due to size and cost consideration. A power plant may include several of these large module enclosures, which presents at least two challenges. First, suitable ducting (e.g., stainless steel, insulated pipes, etc.) is necessary to provide hot process gases (~650° C.) to the modules. Second, during repair or replacement of an individual fuel cell stack in the large module enclosure, all of the fuel cell stacks need to be taken offline (i.e., shut down) because when the "hot zone" containing the fuel cell stacks is opened, the zone would be cooled down. As a result, the remaining fuel cell stacks would likely not be able to operate at the lower temperatures.

It would be advantageous to provide a fuel cell module assembly that can receive and output lower temperature process gases and to provide systems that enable replacement of fuel cell stacks with minimal disruption to the remaining fuel cell stacks in the power plant.

SUMMARY

In accordance with an embodiment of the present invention, a fuel cell module assembly is provided including a fuel cell stack assembly, a heat exchanger, and a housing enclosing the fuel cell stack assembly and the heat exchanger. The fuel cell stack assembly has a fuel cell stack configured to receive and output a first process gas and a plurality of manifolds including a first manifold configured to provide the first process gas to the fuel cell stack and a second manifold configured to receive the first process gas output from the fuel cell stack. The heat exchanger is configured to receive the first process gas from an external source and output the first process gas to the first manifold, and configured to receive the first process gas from the second manifold and output the first process gas.

In accordance with an embodiment of the present invention, a fuel cell power plant system is provided including a module assembly with a first end and housing a fuel cell stack, a racking structure configured to, during an installed mode, hold the module assembly, balance of plant equipment, and ducting configured to, during the installed mode, provide fluid communication between the balance of plant equipment and the first end of the module assembly. The module assembly and the racking structure are configured such that, during a removal mode, the module assembly may be removed from the racking structure in a direction away from the first end of the fuel cell module.

DETAILED DESCRIPTION

The present invention provides a fuel cell module assembly that may be stacked in relationship to other fuel cell module assemblies, for example in a racking structure, and may be extracted (or installed) horizontally, resulting in a higher power density plant (e.g., MW/acre) compared to a conventional fuel cell power plant. The present fuel cell module assemblies may enable the modular construction of a power plant, which may increase the flexibility of the power capability of the plant while reducing the time and cost of construction and the size of the plant. The present fuel cell module assemblies may also include heat exchangers (or heat recuperators and the like), which may allow the present fuel cell modules to receive and output cooler process gases compared to convention fuel cell modules, which in turn may allow the construction of a power plant with smaller, cheaper ducting (e.g., smaller diameter ducting, cheaper ducting materials) compared to a conventional fuel cell power plant. The present fuel cell module assemblies may be used in a controllable unit of module assemblies (e.g., module cluster). A power plant with multiple controllable units can remain operational (i.e., producing power) when a particular module assembly is serviced because only the controllable unit for that particular module assembly needs to be taken offline and the remaining controllable units may remain online and available to produce power.

Figure 1:
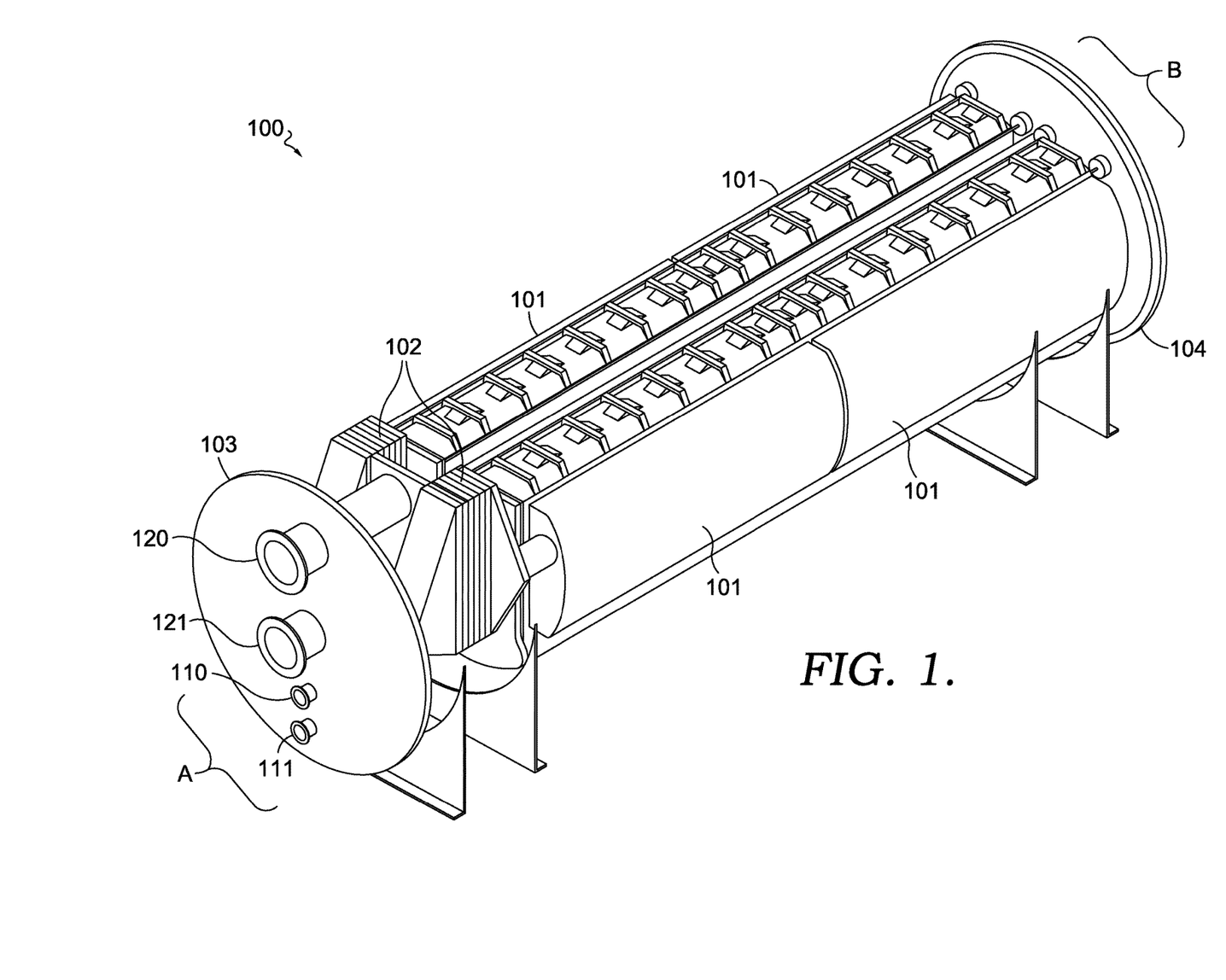
FIG. 1 is a perspective view of a fuel cell module assembly, according to an embodiment of the present invention.

The present invention provides a fuel cell module assembly including one or more fuel cell stacks and one or more heat exchangers. The fuel cell module assembly may include an exterior housing that encloses the one or more fuel cell stacks and the one or more heat exchangers. An embodiment of the present invention depicted in FIG. 1 is described below. However, it will be appreciated that the invention is not limited to the particular depiction in FIG. 1.

FIG. 1 shows a perspective view of a fuel cell module assembly (module assembly) 100, according to an embodiment of the present invention. Module assembly 100 may include a plurality of fuel cell stack assemblies (stack assemblies) 101, heat exchangers 102, a first containment wall 103, and a second containment wall 104. In an embodiment, an outer longitudinal containment wall (not shown) connects the first and second containment walls to form a sealed enclosure for module assembly 100 (e.g., a housing). In another embodiment, the outer longitudinal containment wall (not shown) forms a enclosure around the components and assemblies contained within module assembly 100. The enclosure may have any shape suitable to enclose the subassemblies of the fuel cell module assembly and/or to allow the fuel cell module to be installed or removed from a racking structure configured to hold one or more fuel cell module assemblies. For example, the enclosure may be have a square, rectangular, or round footprint, may have a cuboid or cylindrical shape. Although the first and second containment walls 103, 104 depicted in FIG. 1 have a circular perimeter, the present invention is not so limited. The perimeter of first and second containment walls 103, 104 may have a square, rectangular or other shape, and may be the same or different from one another. Module assembly 100 may also have a plurality of longitudinal containment walls as opposed to a single, cylindrical wall in the case of a cylindrical or tubular housing. For example, module assembly 100 may have a rectangular cuboid shape or other shape.

First containment wall 103 located at a first end A (also referred to as a "process end") of module assembly 100 may include openings or conduits (e.g., ports, piping, ducting) for receiving and outputting process gases, such as fuel feed gas, fuel exhaust, oxidant feed gas, and oxidant exhaust. Process gas may also refer to a gas stream that enters a fuel cell system, is processed within the fuel cell system, and exits the fuel cell system. For example, an anode process gas enters a fuel cell system as anode feed gas, is electrochemically processed at the anode of a fuel cell, and exits the fuel cell system as anode exhaust. Likewise, a cathode process gas enters the fuel cell system as cathode feed gas, is electrochemically processed at the cathode of a fuel cell, and exits the fuel cell system as cathode exhaust. As shown in FIG. 1, first containment wall 103 includes anode input port 110 for receiving anode process gas (feed), anode output port 111 for outputting anode process gas (exhaust), cathode input port 120 for receiving cathode process gas (feed), and cathode output port 121 for outputting cathode process gas (exhaust).

Second containment wall 104 located at a second end B (also referred to as an "electrical end" or "extraction end") of module assembly 100 may include electrical connections for receiving/outputting control signals to components and subassemblies contained within module assembly 100 and/or outputting electrical power produced by fuel cell stack subassemblies 101. The electrical connections may include contacts, connectors, ports, plugs, etc., which electrically connect module assembly 100 to other electrical components, control centers, and/or other assemblies within a power plant supporting module assembly 100. In another embodiment, said electrical connections may be located at the process end of module assembly 100 (e.g., on or near first containment wall 103). As will be described below, when installed in a racking structure, module assembly 100 may be extracted from the racking structure by pulling the second end of module assembly 100, for example with a crane, pulley system, etc., away from the racking structure. In an embodiment, second containment wall 104 may include hooks, protrusions, or other structural features suitable for connecting to (or coupling with) an extraction mechanism (e.g., crane, pulley system, etc.).

As depicted in FIG. 1, module assembly 100 contains four stack assemblies 101. However, the present invention is not so limited. Module assembly 100 may contain fewer or more stack assemblies 101. In the embodiment of FIG. 1, stack assemblies 101 are oriented horizontally and the fuel cell stacks contained within stack assemblies 101 have a plurality of fuel cells (each cell having an anode, a matrix, and a cathode) stacked horizontally. Manifolds extend laterally along the sides of each stack assembly 101. The manifolds carry process gases to or from the anode and cathode of the fuel cells within stack assemblies 101. In certain embodiments, during operation the manifolds act as ducting configured to convey hot process gases to fuel cells contained within stack assemblies 101. In an embodiment, the plurality of manifolds includes a first manifold and a second manifold, and the first manifold is configured to provide a process gas to the fuel cell stack and the second manifold is configured to receive the process gas output from the fuel cell stack.

As depicted in FIG. 1, module assembly 100 contains two heat exchangers 102, which are located between first containment wall 103 and stack assemblies 101. However, the present invention is not so limited. Module assembly 100 may contain fewer or more heat exchangers 102. In another embodiment, heat exchangers 102 may span a length of stack assemblies 101. For example, a plurality of heat exchangers 102 may be located underneath, on top of, or along the longitudinal axis of stack assemblies 101. In this embodiment, a given unit of heat exchanger(s) 102 may be sized appropriately for a given size or power density of stack assembly 101. In such embodiment, a higher proportion of lateral space within module assembly 100 may be used for power generation (i.e., with fuel cells). In an embodiment, the heat exchanger is configured to receive a process gas from an external source and output the process gas to the fuel cell stack (via a first manifold), and configured to receive the process gas from the fuel cell stack (via a second manifold) and output the process gas as a module exhaust stream (e.g., away from module assembly 101 toward post-processing equipment or into the surrounding environment as plant exhaust).

As noted above, fuel cells, such as MCFCs, operate at approximately 570° C. to 670° C. In a conventional MCFC power plant, process gases entering a conventional MCFC module should be approximately 650° C. and the ducting entering those modules must be able to carry process gases at that temperature (and accommodate corresponding volumes for those gases). To withstand such temperatures, costly materials such as stainless steel and/or insulating materials may be needed for the ducting. By integrating heat exchangers (or heat recuperators and the like) into the present fuel cell module assemblies, during operation lower temperature process gases can be provided to the modules themselves. For example, cathode input (oxidant feed gas) to the present module may be near ambient temperature or 85%-95% cooler than operating temperature (e.g., about 20° C. to 65° C.); cathode output (oxidant exhaust) from the present module may be 70%-80% cooler than operating temperature (e.g., about 100° C. to 150° C.); anode input (fuel feed gas) to the present module may be 75%-85% cooler than operating temperature (e.g., about 110° C. to 150° C.); and anode output (fuel exhaust) from the present module may be 70%-80% cooler than operating temperature (e.g., about 150° C. to 200° C.). In an embodiment, heat exchangers integrated in the module assembly are configured to receive feed gases and output exhaust gases with a temperature below the operating temperature of the fuel cells and above the condensation temperature of the process gas, and output feed gases and receive exhaust gases at about or near the operating temperature of the fuel cells. In an embodiment, during operation, in the heat exchangers, process gases leaving the fuel cells may heat process gases entering the module assembly, and process gases leaving the module assembly may be cooled by process gases entering the module assembly.

Moreover, lower process gas temperatures allow for the use of cheaper materials for the ducting (e.g., uninsulated pipes, galvanized steel). In addition, the size of ducting to the present modules may be decreased relative to conventional modules (having the same process gas demands). For example, ducting deployed in a plant with the present modules may have 2-3 times smaller volume than ducting deployed in a plant with conventional modules (having the same process gas demands). Process plant piping and insulation are a significant portion of the overall plant volume and footprint, especially for very large systems. The lower process temperature and smaller pipe and ducting facilitated by the present design enables the overall footprint of the plant to be significantly reduced.

Figure 2:
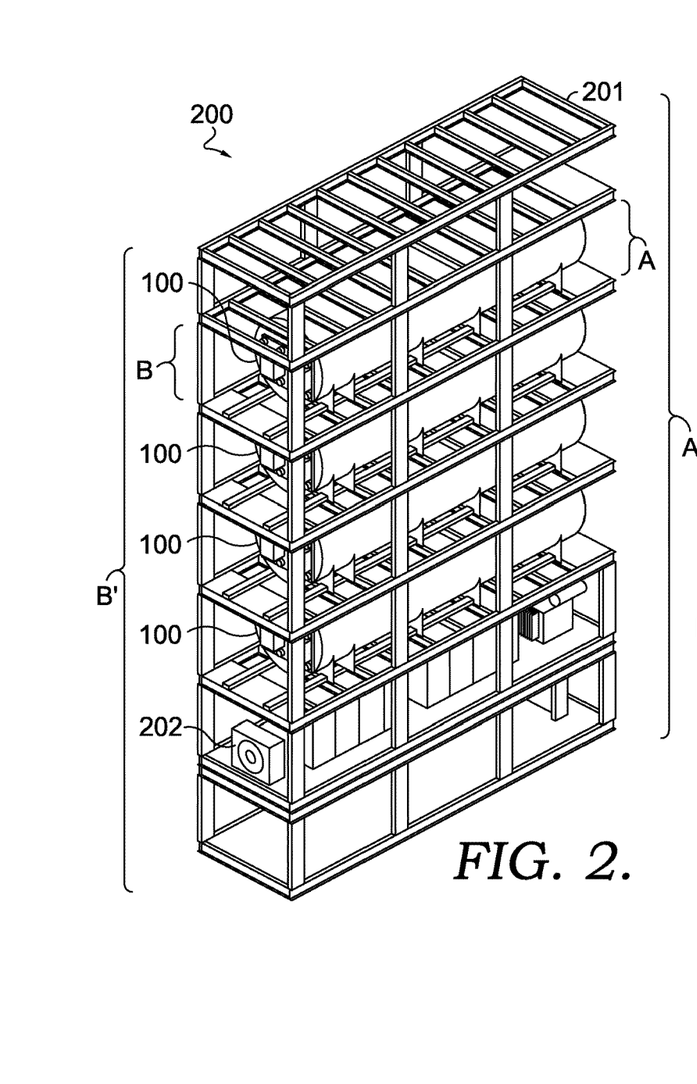
FIG. 2 is a perspective view of a module cluster, according to an embodiment.

FIG. 2 shows a perspective view of a module cluster 200, according to an embodiment of the present invention. Module cluster 200 may include a racking structure 201 configured to hold a plurality of module assemblies 100 (shown with a housing enclosing stack assemblies 101 and heat exchangers 102), balance of plant equipment 202, and ducting 301 (depicted in FIGS. 3 and 4). Racking structure 201 and module assembly 100 may operate together in an installed mode, a removal mode, or an installation mode. In the installed mode, the ducting 301 is configured to provide fluid communication between the balance of plant equipment 202 and first end A of module assemblies 100. In the removal mode, module assembly 100 is removable from racking structure 201 in a direction away from first end A of module assembly 100 (e.g., toward second end B of module assembly 100). In the installation mode, module assembly 100 is installed into racking structure 201 in a direction toward first end A of module assembly 100.

Racking structure 201 may have a first end A' and, on an opposite end, a second end B'. When installed, the first ends A of module assemblies 100 may be proximate to first end A' of racking structure 201. During removal, module assemblies 100 may be removed from the second end B' of racking structure 201.

As depicted in FIG. 2, racking structure 201 holds four module assemblies 100. However, the present invention is not so limited. Racking structure 201 may hold fewer or more module assemblies 100. In the embodiment of FIG. 2, racking structure 201 may hold a plurality of module assemblies 100 and balance of plant equipment 202 in a stacked arrangement, and racking structure 201 and module assemblies 100 are configured in such a way that, during removal, module assemblies 100 are removable from racking structure 201 in the same direction (e.g., from second end B' of racking structure 201).

Figure 3:
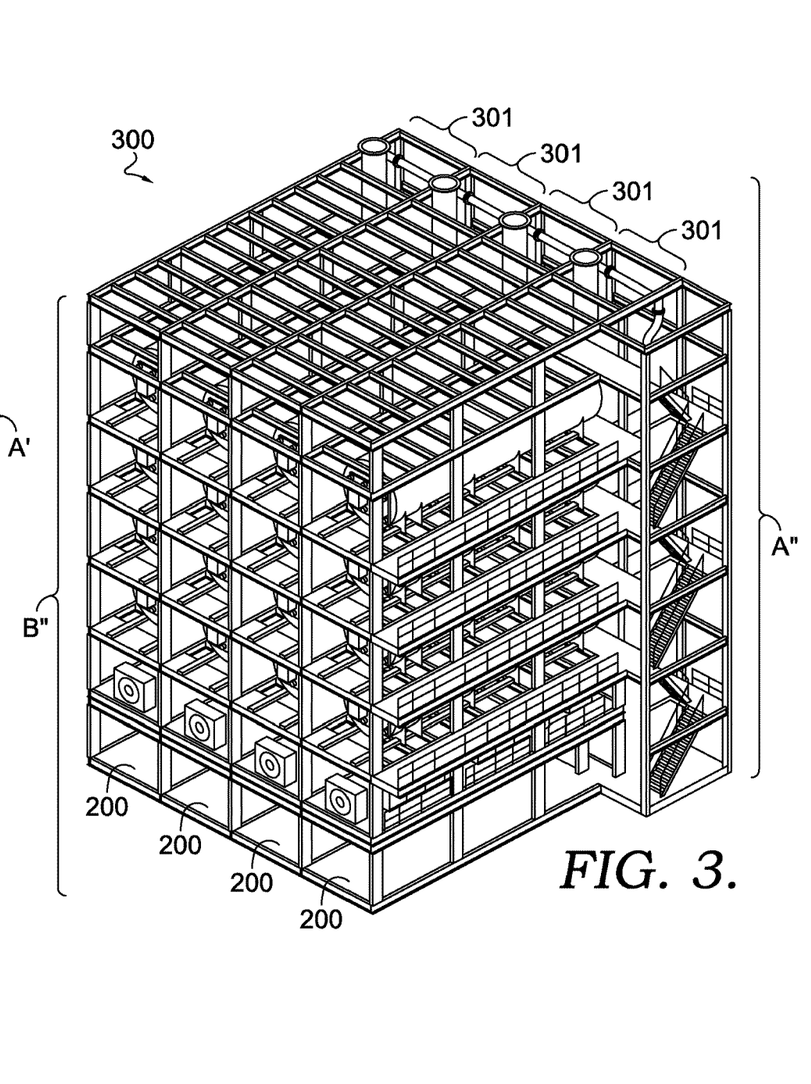
FIG. 3 is a perspective view of a cluster group including a plurality of racking structures, according to an embodiment.

FIG. 3 shows a perspective view of a cluster group 300, according to an embodiment of the present invention. Cluster group 300 may include a plurality of module clusters 200 (including ducting 301). Cluster group 300 may have a first end A" and a second end B". Ducting 301 of each module cluster 200 may be proximate first end A" of cluster group 300. In an embodiment, module assemblies held in each cluster group 200 may be removed in the same direction (e.g., from second end B" of cluster group 300).

As depicted in FIG. 3, cluster group 300 includes four module clusters 200 arranged in a side by side arrangement. However, the present invention is not so limited. Cluster group 300 may include fewer or more module clusters 200.

During a removal mode, a single module cluster 200 within Cluster group 300 may be electrically and/or fluidly isolated from the other module clusters 200. When a module assembly 100 from a module cluster 200 is removed, the affected module cluster 200 may be taken "off-line" or isolated electrically from the remaining module clusters 200 within cluster group 300 and process gases may be shunted away from the affected module cluster 200. The remaining module clusters 200 may remain "on-line" or available to receive/output process gases and to produce electric power.

Figure 4:
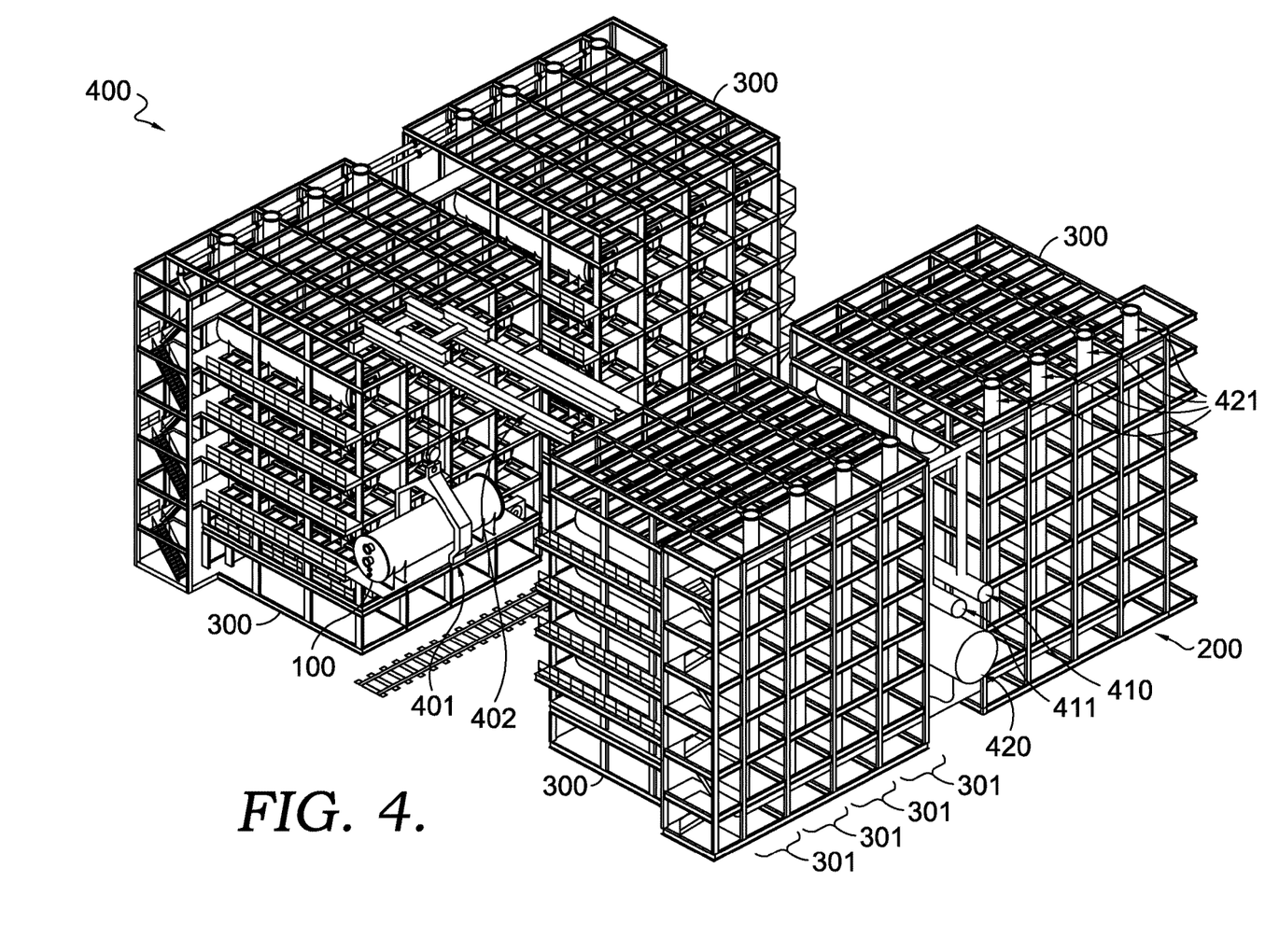
FIG. 4 is a perspective view of a power plant system including a plurality of cluster groups, according to an embodiment.

FIG. 4 shows a perspective view of a power plant 400, according to an embodiment of the present invention. Power plant 400 may include a plurality of cluster groups 300, a crane assembly 402 (or similar apparatus) configured to raise/lower a module assembly 100 and install/remove said module assembly 100 into/from cluster group 300. Crane assembly 402 may include a carriage assembly 401 configured to hold module assembly 100 as crane assembly 402 raises/lowers and installs/removes said module assembly 100.

As depicted in FIG. 4, power plant 400 may include anode feed gas ducting 410, anode exhaust ducting 411, cathode feed gas ducting 420, and cathode exhaust ducting 421. An external source for cathode feed gas may be ambient air, a combustion source, or other source emitting carbon dioxide emissions. For example, cathode feed gas ducting 420 may be fluidly connected to a flue gas source (e.g., a power generating facility or industrial facility). Cathode process gas may be exhausted to the environment via cathode exhaust ducting 421. An external source for anode feed gas may be any hydrocarbon source (e.g., natural gas pipeline, anaerobic digester, etc.). It being understood that such anode feed gas may pass through one or more gas processing/treatment assemblies. Such processing/treatment assemblies may be part of the balance of plant equipment. From module assembly 100, processed anode gas (anode exhaust) may be sent to post-processing assemblies (e.g., for carbon capture, etc.). Balance of plant equipment may include assemblies configured to prepare process gases for introduction into fuel cells and assemblies configured to process exhaust gases (e.g., for carbon capture, etc.).

Figure 5:
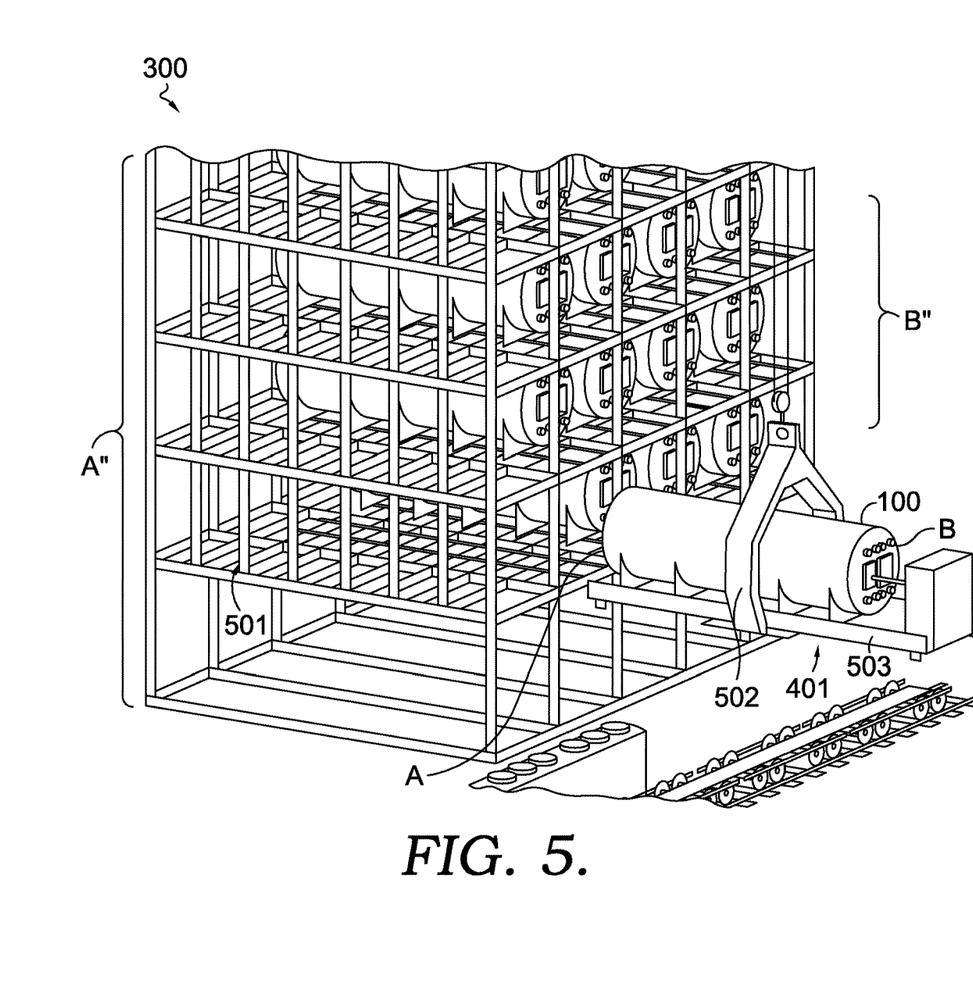
FIG. 5 is a perspective view of a fuel cell module assembly and racking structure during a removal mode or an installation mode, according to an embodiment.

FIG. 5 shows a perspective view of a module assembly 100 (to be removed or installed) and cluster group 300 during a removal mode or an installation mode, according to an embodiment. In this embodiment, during an installation mode and working with a crane or other lifting mechanism, carriage assembly 401 may secure module assembly 100 from a transportation mechanism (e.g., rail car, trailer bed, etc.) or staging area and move (e.g., raise, rotate, position, etc.) module assembly 100 toward second end B" of cluster group 300 (and second end B' of racking structure 201). Carriage assembly 401 may position module assembly 100 such that module assembly 100 can be installed into an open racking structure level 501 (by sliding, pushing, pulling, translating, etc.). The above described process may be reversed during a removal mode.

Racking structure levels 501 and/or module assembly 100 may include rails, tracks, grooves, sliding surfaces, rollers, and the like to enable movement of module assembly 100 into and out racking structure 201.

Carriage assembly 401 may be any such assembly known in the art capable of lifting heavy industrial components or equipment (e.g., large heat exchangers) and capable of translating such components or equipment into a raised structure. Carriage assembly 401 may be configured to accommodate a moving center of gravity as module assembly 100 is displaced from carriage assembly 401. For example, carriage assembly 401 may include a carriage structure 502 and a carriage platform 503, which are configured to move laterally in relation to each other such that carriage structure 502 may maintain a position proximate to the center of gravity of carriage assembly 401 as weight loads are moved onto or off of carriage platform 503.

Figure 6:
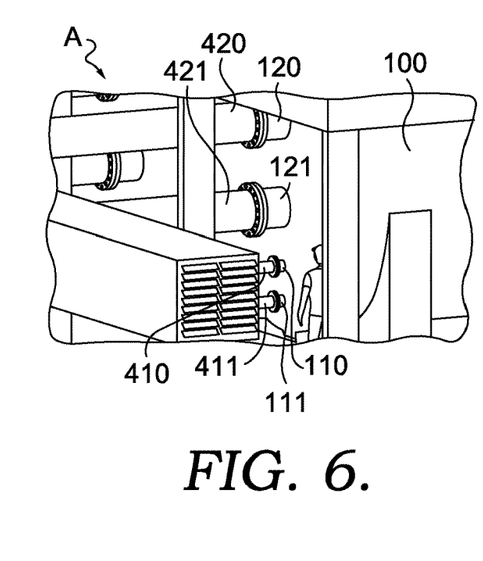
FIG. 6 is a close up perspective view of a fuel cell module assembly connected to ducting, according to an embodiment.

FIG. 6 shows a close up perspective view near first end A" of cluster group 300 (or first end A' of racking structure 200) of module assembly 100 connected to ducting, according to an embodiment of the present invention. As depicted in FIG. 6, ports located on first end A of module assembly 100 communicate with ducting located near first end A" of cluster group 300 (or first end A' of racking structure 200). During an installed mode, anode input port 110 communicates with anode feed gas ducting 410, anode output port 111 communicates with anode exhaust ducting 411, cathode input port 120 communicates with cathode feed gas ducting 420, and cathode output port 121 communicates with cathode exhaust ducting 421. Communication between ports on module assembly 100 and ducting may be by any means or methods know in the art. Communication between module assembly ports and ducting may be releasable (e.g., bolts, screws, clamps, static force, etc.) or non-releasable (e.g., welded). In a preferred embodiment, communication between module assembly ports and module cluster ducting is releasable. It should be understood that any communication creates a fluid connection between module assembly ports and module cluster ducting that is sealed from the surrounding environment. Seals, gaskets, and the like may be used to create a sealed connection between module assembly ports and module cluster ducting.

In some embodiments, the communication between module assembly ports and module cluster ducting may be maintained by gravity or some other static force. For example, the weight of module assembly 100 may secure the connection between module assembly ports and module cluster ducting. In another example, module assembly 100 may be pushed toward module cluster ducting such that module assembly ports are pressed into receiving ends of cluster ducting. A static force may be applied to module assembly 100 to maintain a sealed connection between module assembly ports and receiving ends of cluster ducting.

Figure 7:
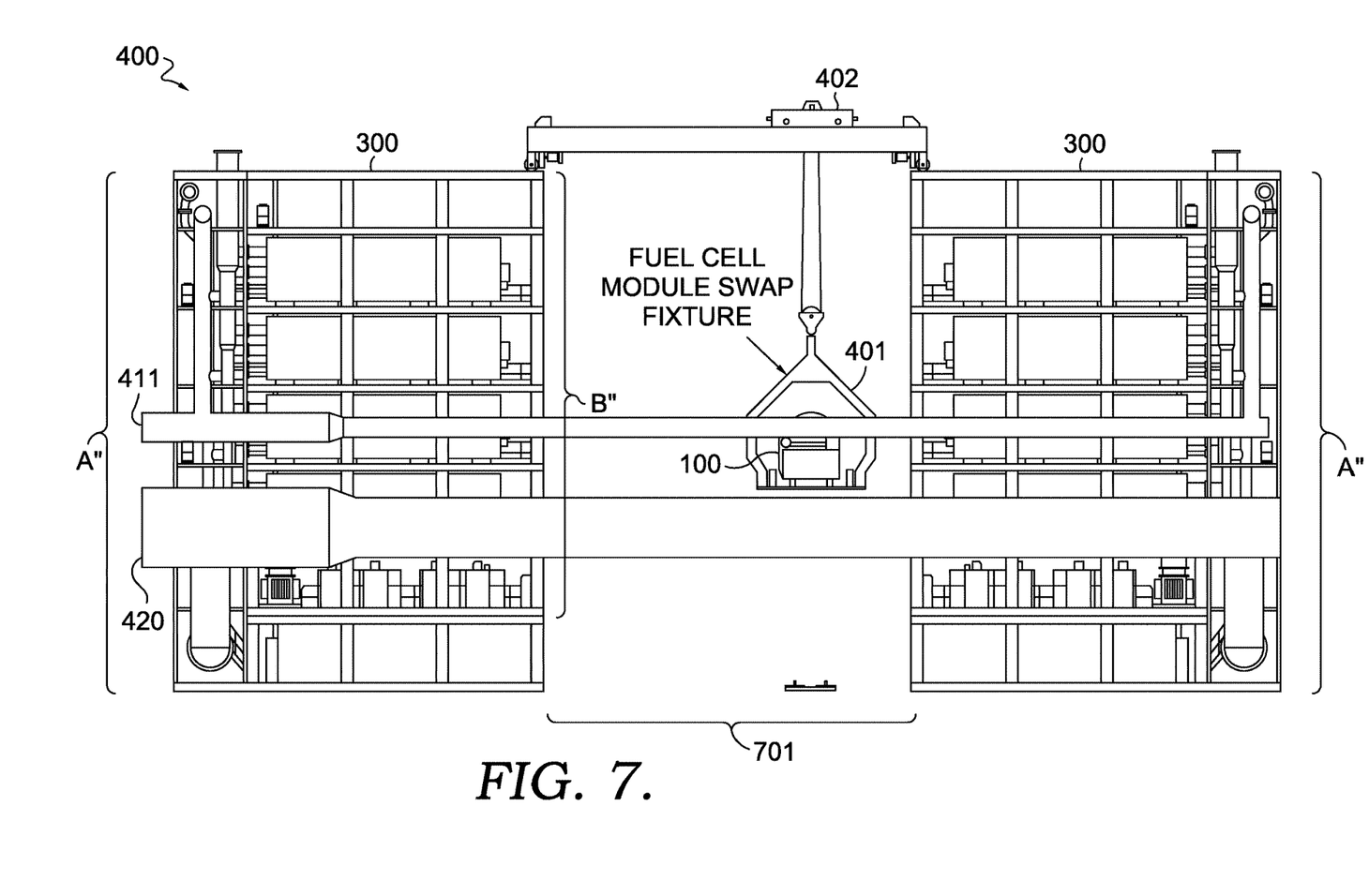
FIG. 7 is a cutaway side elevation view of the power plant system of FIG. 4.

FIG. 7 shows a cutaway side elevation view of power plant 400, according to an embodiment of the present invention. Two cluster groups 300 may be oriented such that second ends B" of the cluster groups 300 may face each other and create a staging area 701 between the second ends B", which may be appropriately sized to accommodate receiving module assembly 100 from an offsite location, securing module assembly 100 (e.g., with carriage assembly 401), and orienting module assembly 100 for installation into one or the other of the two cluster groups 300 (e.g., by rotating module assembly 100 such that first end A of module assembly 100 points toward cluster group 300 to which module assembly 100 will be installed). Crane assembly 402 may be configured to translate along a face of second end B" of cluster group 300 such that crane assembly 402 may position carriage assembly 401 proximate to any racking structure 200 contained in cluster groups 300. Crane assembly 402 may be configured to raise (or lower) carriage assembly 401 proximate to any racking structure level 501 within cluster groups 300. Carriage assembly 401 and crane assembly 402 may be configured to rotate module assembly 100 for installation into or removal from cluster groups 300.

Additional Embodiments

Embodiment 1. A fuel cell module assembly comprising: a fuel cell stack assembly comprising: a fuel cell stack configured to receive and output a first process gas, and a plurality of manifolds including a first manifold and a second manifold, wherein the first manifold is configured to provide the first process gas to the fuel cell stack and the second manifold is configured to receive the first process gas output from the fuel cell stack, a heat exchanger configured to receive the first process gas from an external source and output the first process gas to the first manifold, and configured to receive the first process gas from the second manifold and output the first process gas, and a housing enclosing the fuel cell stack assembly and the heat exchanger.

Embodiment 2. The fuel cell module assembly of embodiment 1, wherein the fuel cell stack is further configured to receive and output a second process gas, and wherein the plurality of manifolds includes a third manifold and a fourth manifold, wherein the third manifold is configured to provide the second process gas to the fuel cell stack and the fourth manifold is configured to receive the second process gas output from the fuel cell stack, and wherein the heat exchanger is further configured to receive the second process gas from a second external source and output the second process gas to the third manifold, and configured to receive the second process gas from the fourth manifold and output the second process gas.

Embodiment 3. The fuel cell module assembly of embodiment 2, wherein the housing comprises a plurality of ports located at a first end of the housing, wherein the plurality of ports are fluidly connected to the heat exchanger and includes a first port, a second port, a third port, and a fourth port, and wherein the first port is configured to receive the first process gas from the external source, the second port is configured to output first process gas from the housing, the third port is configured to receive the second process gas from the second external source, and the fourth port is configured to output the second process gas from the housing.

Embodiment 4. The fuel cell module assembly of embodiment 2 or 3, wherein the heat exchanger is further configured to receive the first process gas from the external source at a first temperature and output the first process gas to the fuel cell stack assembly at a second temperature, wherein the first temperature is from about 85% to about 95% cooler than the second temperature.

Embodiment 5. The fuel cell module assembly of embodiment 4, wherein the heat exchanger is further configured to receive the first process gas from the fuel cell stack assembly at a third temperature and output the first process gas at a fourth temperature, wherein the fourth temperature is from about 70% to about 80% cooler than the third temperature.

Embodiment 6. The fuel cell module assembly of embodiment 5, wherein the heat exchanger is further configured to receive the second process gas from the second external source at a fifth temperature and output the second process gas to the fuel cell stack assembly at a sixth temperature, wherein the fifth temperature is from about 75% to about 85% cooler than the sixth temperature.

Embodiment 7. The fuel cell module assembly of embodiment 6, wherein the heat exchanger is further configured to receive the second process gas from the fuel cell stack assembly at a seventh temperature and output the second process gas at an eighth temperature, wherein the eighth temperature is from about 70% to about 80% cooler than the seventh temperature.

Embodiment 8. A fuel cell power plant system comprising: a module assembly having a first end and comprising a fuel cell stack, a racking structure configured to, during an installed mode, hold the module assembly, balance of plant equipment, and ducting configured to, during the installed mode, provide fluid communication between the balance of plant equipment and the first end of the module assembly, wherein the module assembly and the racking structure are configured such that, during a removal mode, the module assembly is removable from the racking structure in a direction away from the first end of the module assembly.

Embodiment 9. The fuel cell power plant system of embodiment 8, wherein the racking structure has a first end and a second end opposite the first end, wherein at least a portion of the ducting is proximate the first end of the racking structure, and wherein, during the installed mode, the first end of the module assembly is proximate the first end of the racking structure.

Embodiment 10. The fuel cell power plant system of embodiment 9, wherein the module assembly and the racking structure are configured such that, during the removal mode, the module assembly is removable from the second end of the racking structure.

Embodiment 11. The fuel cell power plant system of any of embodiments 8-10, wherein the fuel cell stack is configured to receive and output a process gas, and wherein the module assembly further comprises: a plurality of manifolds including a first manifold and a second manifold, wherein the first manifold is configured to provide the process gas to the fuel cell stack, and the second manifold is configured to receive the process gas output from the fuel cell stack, and a heat exchanger configured to receive the process gas at a first temperature from an external source and to output the process gas at a second temperature to the first manifold, and configured to receive the process gas at a third temperature from the second manifold and to output the process gas a fourth temperature.

Embodiment 12. The fuel cell power plant system of embodiment 11, wherein the first temperature is about 75% to about 95% cooler than the second temperature, and the fourth temperature is about 70% to 80% cooler than the third temperature.

Embodiment 13. The fuel cell power plant system of any of embodiments 8-12, further comprising a plurality of module assemblies and wherein the racking structure is configured to hold the plurality of module assemblies in a stacked arrangement, and wherein the racking structure and each of the plurality of module assemblies are configured such that, during the removal mode, the module assemblies are removable from the racking structure in a same direction.

Embodiment 14. The fuel cell power plant system of embodiment 10, further comprising: a plurality of module assemblies including the module assembly; and wherein the racking structure is configured to hold the plurality of module assemblies in a stacked arrangement.

Embodiment 15. The fuel cell power plant system of embodiment 14, wherein the racking structure is configured to hold the balance of plant equipment in a stacked arrangement relative to the plurality of module assemblies.

Embodiment 16. The fuel cell power plant system of embodiment 15, wherein the ducting comprises a trunk proximate the first end of the racking structure and configured to extend away from the balance of plant equipment toward the plurality of module assemblies, and a plurality of branches extending away from the trunk including a first branch configured to communicate with the module assembly.

Embodiment 17. The fuel cell power plant system of any of embodiments 14-16, wherein the plurality of module assemblies, the racking structure, the balance of plant equipment, and the ducting form a module cluster.

Embodiment 18. The fuel cell power plant system of embodiment 17, further comprising a plurality of module clusters including the module cluster.

Embodiment 19. The fuel cell power plant system of embodiment 18, wherein, during the removal mode, the module cluster is configured to be electrically and/or fluidly isolated from other module clusters among the plurality of module clusters.

Embodiment 20. The fuel cell power plant system of embodiment 18 or 19, wherein the plurality of module clusters are arranged side by side to form a cluster group, wherein the cluster group has a first end, and wherein the first end of each racking structure among the plurality of module clusters is at the first end of the cluster group.

Embodiment 21. The fuel cell power plant system of embodiment 20, further comprising a plurality of cluster groups including the cluster group.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fuel cell module assembly comprising:
   a fuel cell stack assembly comprising:
   a fuel cell stack configured to receive and output a first process gas, and
   a plurality of manifolds including a first manifold and a second manifold,
   wherein the first manifold is configured to provide the first process gas to the fuel cell stack and the second manifold is configured to receive the first process gas output from the fuel cell stack,
   a heat exchanger configured to receive the first process gas from an external source and output the first process gas to the first manifold, and configured to receive the first process gas from the second manifold and output, away from the fuel cell module assembly, the first process gas, and
   a housing enclosing the fuel cell stack assembly and the heat exchanger,
   wherein the fuel cell stack is further configured to receive and output a second process gas, and
   wherein the plurality of manifolds includes a third manifold and a fourth manifold, wherein the third manifold is configured to provide the second process gas to the fuel cell stack and the fourth manifold is configured to receive the second process gas output from the fuel cell stack, and
   wherein the heat exchanger is further configured to receive the second process gas from a second external source and output the second process gas to the third manifold, and configured to receive the second process gas from the fourth manifold and output the second process gas.

2. The fuel cell module assembly of claim 1, wherein the housing comprises a plurality of ports located at a first end of the housing,
   wherein the plurality of ports are fluidly connected to the heat exchanger and includes a first port, a second port, a third port, and a fourth port, and
   wherein the first port is configured to receive the first process gas from the external source, the second port is configured to output first process gas from the housing, the third port is configured to receive the second process gas from the second external source, and the fourth port is configured to output the second process gas from the housing.

3. The fuel cell module assembly of claim 1, wherein the heat exchanger is further configured to receive the first process gas from the external source at a first temperature and output the first process gas to the fuel cell stack assembly at a second temperature,
   wherein the first temperature is from about 85% to about 95% cooler than the second temperature.

4. The fuel cell module assembly of claim 3, wherein the heat exchanger is further configured to receive the first process gas from the fuel cell stack assembly at a third temperature and output the first process gas at a fourth temperature,
   wherein the fourth temperature is from about 70% to about 80% cooler than the third temperature.

5. The fuel cell module assembly of claim 4, wherein the heat exchanger is further configured to receive the second process gas from the second external source at a fifth temperature and output the second process gas to the fuel cell stack assembly at a sixth temperature,
   wherein the fifth temperature is from about 75% to about 85% cooler than the sixth temperature.

6. The fuel cell module assembly of claim 5, wherein the heat exchanger is further configured to receive the second process gas from the fuel cell stack assembly at a seventh temperature and output the second process gas at an eighth temperature,
   wherein the eighth temperature is from about 70% to about 80% cooler than the seventh temperature.

* * * * *